(12) United States Patent  (10) Patent No.: US 9,009,108 B2
Khosravy et al.  (45) Date of Patent: *Apr. 14, 2015

(54) MINIMAL EXTENSIONS REQUIRED FOR MULTI-MASTER OFFLINE AND COLLABORATION FOR DEVICES AND WEB SERVICES

(71) Applicant: Microsoft Corporation, Redmond, WA (US)

(72) Inventors: Moe Khosravy, Bellevue, WA (US); Lev Novik, Bellevue, WA (US); Michael Ray Clark, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/802,487

(22) Filed: Mar. 13, 2013

(65) Prior Publication Data

US 2013/0198132 A1  Aug. 1, 2013

Related U.S. Application Data

(63) Continuation of application No. 12/198,181, filed on Aug. 26, 2008, now Pat. No. 8,458,128.

(51) Int. Cl.
    *G06F 17/30* (2006.01)
(52) U.S. Cl.
    CPC .... *G06F 17/30371* (2013.01); *G06F 17/30578* (2013.01)
(58) Field of Classification Search
    USPC ................................................ 707/621, 638
    See application file for complete search history.

(56) References Cited

U.S. PATENT DOCUMENTS 7,139,555 B2   11/2006   Apfel
7,359,920 B1    4/2008   Rybicki et al.
2002/0099728 A1 7/2002   Lees et al.
(Continued)

FOREIGN PATENT DOCUMENTS

CN        101142573 A      3/2008
KR    10-2008-0062207 A    8/2006
WO        2010027653 A3    3/2010

OTHER PUBLICATIONS

Sync Framework Overview, retrieved from http://msdn.microsoft.com/en-us/library/bb902814(SQL.100).aspx, retrieved on May 14, 2008, 4 pages.

(Continued)

*Primary Examiner* — Jorge A Casanova
(74) *Attorney, Agent, or Firm* — Aneesh Mehta; Kate Drakos; Micky Minhas

(57) ABSTRACT

The claimed subject matter provides a system and/or a method that facilitates managing data consistency in connection with a plurality of devices. A collection of devices can be associated with a user. A web service can receive a portion of data from at least one device via an interface component, wherein the web service can host and relate the portion of data with an account for the user. A master sync component can leverage a computing resource from at least one device in order to maintain data consistency between at least one of the following: two or more devices within the collection of devices associated with the user; or the account hosted by the web service and two or more devices within the collection of devices associated with the user.

16 Claims, 10 Drawing Sheets

(56) References Cited

U.S. PATENT DOCUMENTS

| | | |
|---|---|---|
| 2004/0172423 A1 | 9/2004 | Kaasten et al. |
| 2005/0044108 A1 | 2/2005 | Shah et al. |
| 2005/0209845 A1 | 9/2005 | Bennett |
| 2005/0256907 A1 | 11/2005 | Novik et al. |
| 2006/0106881 A1 | 5/2006 | Leung et al. |
| 2006/0190572 A1 | 8/2006 | Novik et al. |
| 2006/0215569 A1 | 9/2006 | Khosravy et al. |
| 2007/0067349 A1 | 3/2007 | Jhaveri et al. |
| 2007/0067797 A1 | 3/2007 | Lee et al. |
| 2007/0136390 A1 | 6/2007 | Blum et al. |
| 2007/0271338 A1 | 11/2007 | Anschutz |
| 2007/0276836 A1 | 11/2007 | Chatterjee et al. |

OTHER PUBLICATIONS

Zimbra on Mac OS X: An elegant Solution with Sync Services, retrieved from http://developer.apply.com/business/mackmarket/zimbra.html, retrieved on May 14, 2008, 5 pages.

Introduction to Mobile Collaboration, Oracle Mobile Collaboration Administrator's Guide 10g Release 1 (10.1.2), Part No. B25478-02, retrieved from http://download-uk.oracle.com/docs/cd/b25553_01/mobile.1012/b25478/introocs.htm, retrieved on May 14, 2008, 4 pages.

Petersen, K, et al., "Flexible Update Propagation for Weakly Consistent Replication", Operating Systems Review, Dec. 1, 1997, pp. 288-301, vol. 31, No. 5, ACM, NY, NY.

Wobber, Ted, "Policy-Based Access Control for Peer-to-Peer Replication", Jan. 1, 2008, Microsoft, http://research.microsoft.com/pubs/79654/submitted-final.pdf, 10 pages. (unnumbered).

European Search Report from Corresponding European Application No. EP 09 81 1945, mailed Nov. 7, 2012.

Office Action from corresponding Chinese Patent Application No. 200980134288.9, mailed Dec. 31, 2012, 10 pages.

International Search Report Dated Mar. 16, 2010 for PCT Application 2009/054223.

Hansman et al, SyncML: Synchronizing and Managing Your Mobile Data, Sep. 19, 2002, Prentice Hall, pp. 5-11, 42, 69, 187, 191, 194.

Mahmoud Q.H., Getting Started with Data Synchronization Using SyncML, Sep. 2004, Sun/Oracle, pp. 1-6.

Open Mobile Alliance, SyncML Meta Information, version 1.1.2, Jun. 12, 2003, Open Mobile Alliance, Ltd. pp. 1-23.

"Notice of Allowance Issued in Chinese Patent Application No. 200980134288.9", Mailed Date: Nov. 26, 2013, Filed Date: Aug. 18, 2009, 4 Pages.

MINIMAL EXTENSIONS REQUIRED FOR MULTI-MASTER OFFLINE AND COLLABORATION FOR DEVICES AND WEB SERVICES

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

In light of such advances, the amount of available electronic data grows and it becomes more important to store such data in a manageable manner that facilitates user friendly and quick data searches and retrieval. Today, a common approach is to store electronic data in one or more databases or data stores. In general, a typical data store can be referred to as an organized collection of information with data structured such that a computer program can quickly search and select desired pieces of data, for example. Commonly, data within a data store is organized via one or more tables. Such tables are arranged as an array of rows and columns.

Each individual piece of data, standing alone, is generally not very informative. Data store applications make data more useful because they help users organize and process the data. Data store applications allow the user to compare, sort, order, merge, separate and interconnect the data, so that useful information can be generated from the data and presented by the data. Capacity and versatility of databases have grown incredibly to allow virtually endless storage capacity utilizing databases. However, typical database systems are limited in conveying information or details in an efficient and streamlined manner. For example, a data file must be selected in a detailed view in order to present information such as a file name, a file size, a date of creation, accessed, modified, location, attributes, etc.

With a continuing and increasing creation of data from end-users, the problems and difficulties surrounding finding, relating, manipulating, and storing such data is escalating. End-users write documents, store photos, rip music from compact discs, receive email, retain copies of sent email, etc. For example, in the simple process of creating a music compact disc, the end-user can create megabytes of data. Ripping the music from the compact disc, converting the file to a suitable format, creating a jewel case cover, and designing a compact disc label, all require the creation of data.

Moreover, with the endless amount of data surrounding developers and/or users, data consistency between disparate machines and/or systems can be a complicated and overwhelming task. For example, a user can utilize various devices (e.g., laptop machine, desktop, etc.), wherein data consistency and/or synchronization are of vital concern. In particular, with each device generating large amounts of data, the synchronization of such data is an extremely difficult objective.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate synchronizing data between a plurality of devices and a web service. A master sync component can enable seamless and universal data synchronization between two or more devices. In particular, the master sync component can provide data consistency between two or more devices by leveraging solely a computing resource related to at least one of the devices. Moreover, the master sync component can provide data changes and/or updates between a web service and two or more devices. By utilizing and enforcing item level metadata and collection level metadata, the master sync component can provide data synchronization in a seamless and non-intrusive manner for multiple devices as well as multiple devices and/or web services.

Moreover, the subject innovation can enable correct conflict detection and resolution propagation. In general, an algorithm is provided in which a web service can implement in order to enable peer-to-peer capabilities or offline capabilities without having to re-architect such web service. In other aspects of the claimed subject matter, methods are provided that facilitate managing data consistency between a plurality of devices associated with a particular entity.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
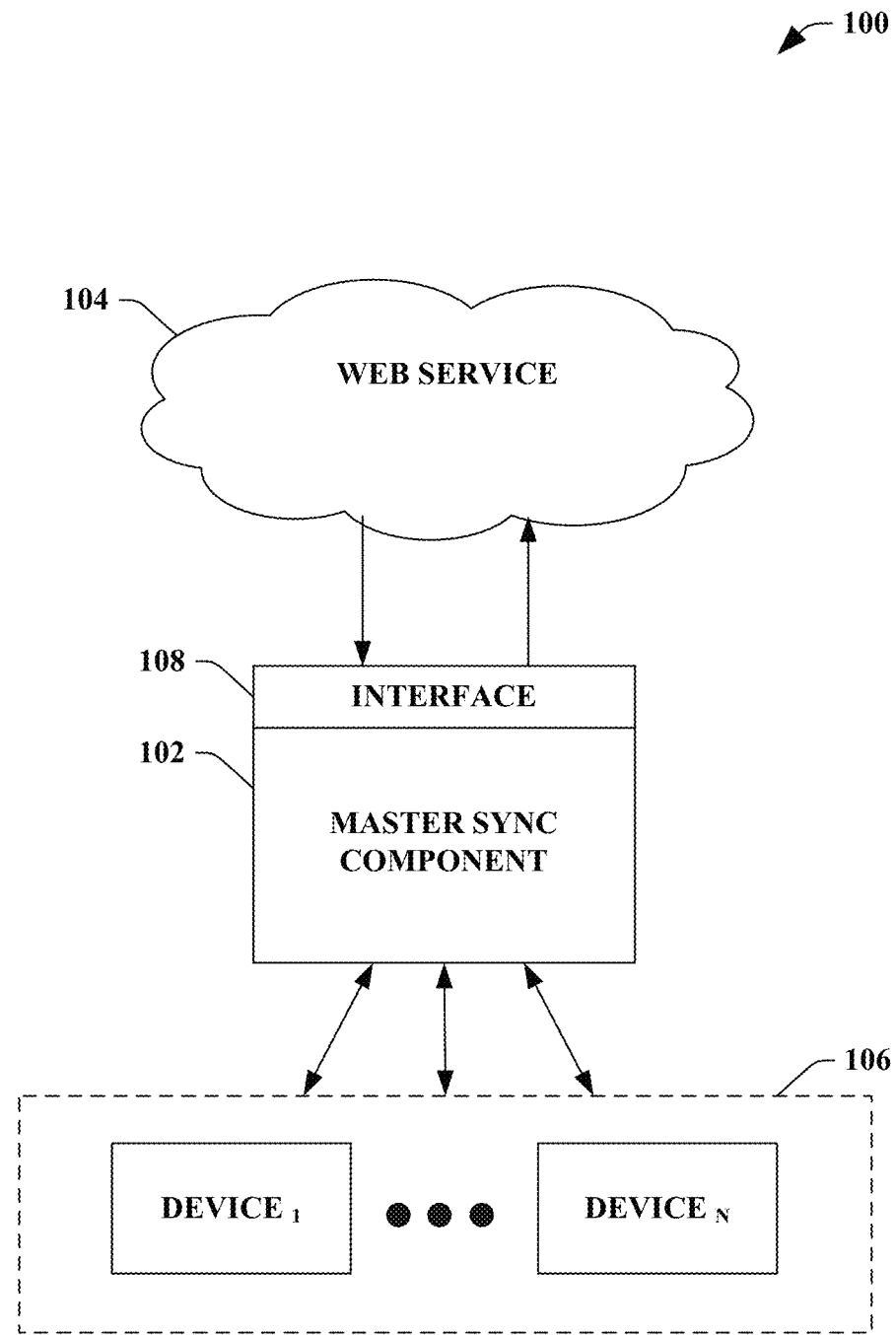
FIG. 1 illustrates a block diagram of an exemplary system that facilitates synchronizing data between a plurality of devices and a web service.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "service," "cloud," "device," "account," "handler," "resolver," "entity," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers. It is to be appreciated that there can be multiple masters in a given two party synchronization and that data can be synchronized in a nearly arbitrary topology (e.g., a pair with at least one master, etc.).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates synchronizing data between a plurality of devices and a web service. The system 100 can include a master sync component 102 that can enforce data consistency between two or more devices 106 and/or between a web service 104 and the two or more devices 106. In general, multiple device data synchronization can be employed by the master sync component 102 as well as data synchronization between multiple devices and the web service 104. In particular, the master sync component 102 can leverage a computing resource associated with at least one device in order to maintain data consistency within two or more devices 106. Moreover, the master sync component 102 can implement data synchronization between the web service 104 and two or more devices 106 by utilizing computing resources related to the two or more devices 106. In other words, the system 100 can provide data synchronization in a seamless and web service independent manner.

For example, a user can own or utilize a smartphone, a laptop computer, and a desktop computer in order to store data (e.g., files, pictures, images, video, audio, etc.). The subject innovation can enable data consistency between the smartphone, the laptop computer, and the desktop computer. In other words, based on user settings (e.g., which devices to include, which data to sync, etc.), the devices and respective data can be evaluated in order to ensure the following: the data on the smartphone is included with the laptop computer and the desktop computer; the data on the laptop computer is included on the smartphone and the desktop computer; and the data on the desktop computer is included on the smartphone and the laptop computer.

In another example, the user can utilize the devices (e.g., the smartphone, the laptop computer, and the desktop computer) to collect, capture, store, etc. data such as images, wherein such data can be utilized in connection with a web service associated images. The web service can enable a user to set up an account and to upload images for viewing, sharing, editing, etc. Yet, the images can be scattered or stored on various devices such as the smartphone, the laptop, and/or the desktop computer. By leveraging the computer resources of the devices, data synchronization can be provided to ensure data consistency independent of the web service. In other words, the web service can be ensured to have accurate and replicated data such as the following: the data on the web service for the user is included on the smartphone, the laptop computer, and the desktop computer; the data on the smartphone is included on the web service for the user, the desktop computer, and the laptop computer; the data on the laptop computer is included on the web service for the user, the smartphone, and the desktop computer; and the data on the desktop computer is included on the web service for the user, the smartphone, and the laptop computer.

In addition, the system 100 can include any suitable and/or necessary interface component 108 (herein referred to as "the interface 108"), which provides various adapters, connectors, channels, communication paths, etc. to integrate the master sync component 102 into virtually any operating and/or database system(s) and/or with one another. In addition, the interface 108 can provide various adapters, connectors, channels, communication paths, etc., that provide for interaction with the master sync component 102, the web service 104, at least one device of the collection of devices 106, and any other device and/or component associated with the system 100.

Figure 2:
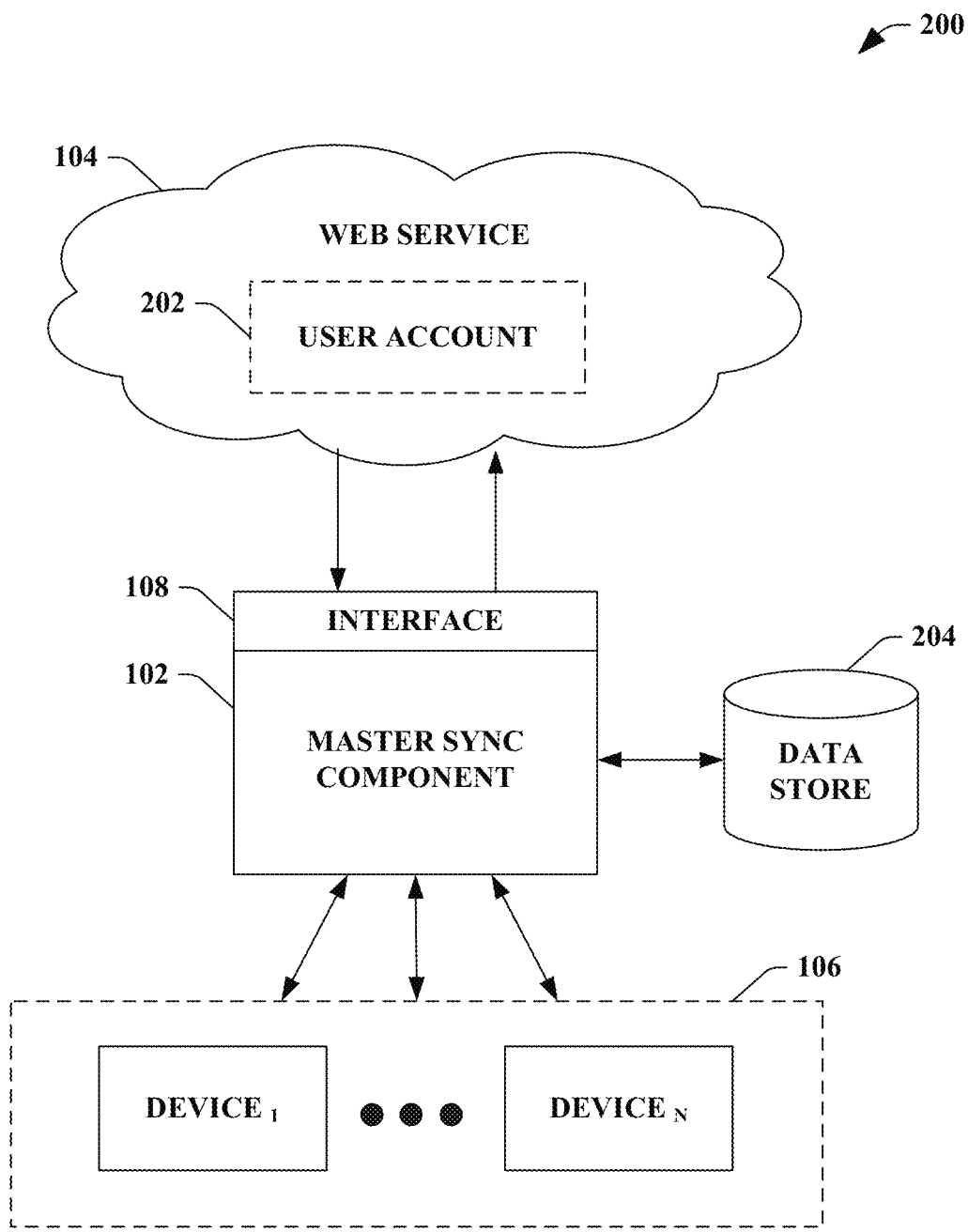
FIG. 2 illustrates a block diagram of an exemplary system that facilitates maintaining data consistency between user devices upon detection of data changes in connection with a web service.

FIG. 2 illustrates a system 200 that facilitates maintaining data consistency between user devices upon detection of data changes in connection with a web service. The system 200 can include the master sync component 102 that can employ data synchronization between two or more devices 106 as well as between two or more devices 106 and the web service 104. In general, the system 100 can utilize data replication techniques in order to ensure that data associated with the two or more devices 106 and/or the web service 104 is substantially similar. The web service 104 can include a user account 202 that is associated with a particular user. The particular user can provide secured information or credentials (e.g., username, password, etc.) in order to access the web service 104. It is to be appreciated that the particular user can communicate a portion of data to the web service 104 for use of such web services.

It is to be appreciated that there can be any suitable number of devices such as device 1 to device N, where N is a positive integer. The device can be, but is not limited to being, a smartphone, a laptop, a desktop, a computer, a machine, a portable digital assistant (PDA), a cellular device, a pager, a two-way, a hand-held, a mobile device, a browsing device, a wireless device, a portable gaming device, a gaming console, a media player, a portable media player, a pen drive, a hard drive, a data store, a digital camera, an image collecting device, a video collecting device, a video camera, an audio collecting device, an audio recorder, global positioning system (GPS), portable web browser, etc. Additionally, it is to be appreciated that the subject innovation can provide data synchronization with any suitable web service. The web service can be, but is not limited to being, an image web service, a video web service, a storage web service, an audio file web service, a data backup web service, a social network service, etc.

The system 200 can further include a data store 204 that can include any suitable data utilized and/or accessed by the master sync component 102, the web service 104, the two or more devices 106, the interface 108, etc. For example, the data store 204 can include, but not limited to including, sync data, sync settings, user preferences, time stamp data, versioning data, web service settings, device listings, item metadata requirements, collection of item metadata requirements, update algorithm, conflict detection techniques, conflict resolution techniques, update data (e.g., time, source, location, etc.), etc. Moreover, although the data store 204 is depicted as a stand-alone component, it is to be appreciated that the data store 204 can be a stand-alone component, incorporated into the master sync component 102, a device, the interface 108, and/or any suitable combination thereof.

It is to be appreciated that the data store 204 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 204 of the subject systems and methods is intended to comprise, without being limited to, these and any other suitable types of memory. In addition, it is to be appreciated that the data store 204 can be a server, a database, a hard drive, a pen drive, an external hard drive, a portable hard drive, and the like.

Figure 3:
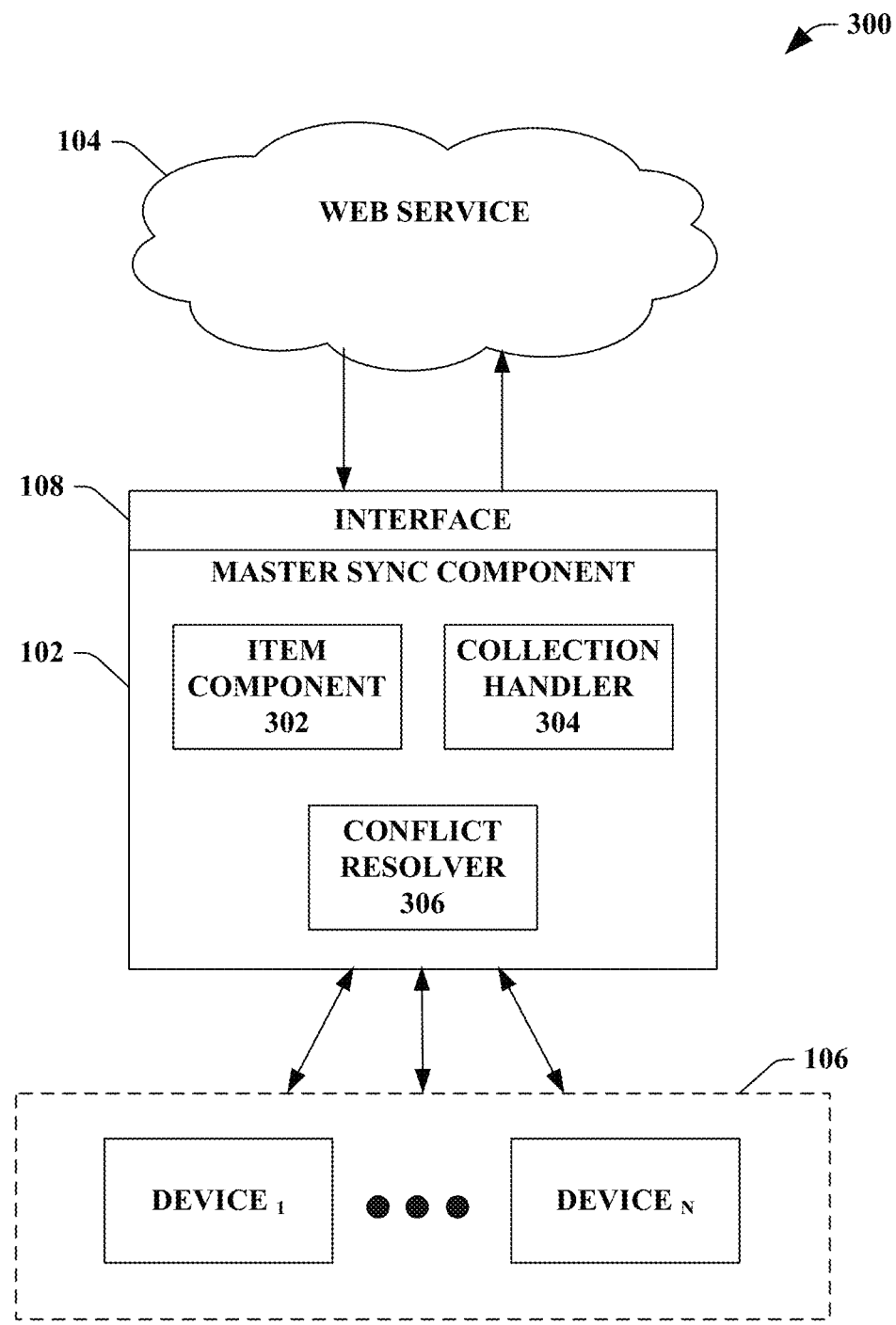
FIG. 3 illustrates a block diagram of an exemplary system that facilitates adapting a web service for seamless and universal data synchronization between two or more user devices.

FIG. 3 illustrates a system 300 that facilitates adapting a web service for seamless and universal data synchronization between two or more user devices. The system of 300 can include the master sync component 102 that can provide data synchronization between two or more devices 106 or between the web service 104 and two or more devices 106. The system 300 can provide multi-master synchronization capabilities that can extend the web service 104 to offline or collaboration scenarios between multiple endpoints (e.g., devices, components, etc.) in a fully connected mesh. For example, the web service 104 can enable a rich client to be in sync from various locations (e.g., work, home, car, vacation, etc.) as well as with multiple devices.

The master sync component 102 can allow endpoints to interpret sync metadata required in a multi-master sync system. In particular, the web service 104 can provide an API or utilize an existing API, wherein such API can enforce item and collection level sync metadata. By employing the item and collection level sync metadata, the web service 104 can provide peer-to-peer (P2P) or offline capabilities (including data synchronization) without re-architecting such web service 104 (e.g., independent data synchronization on a client-side).

The system 300 can include an item component 302 that can enforce metadata characteristic for an item (e.g., a photo, a personal contact, an image file, a portion of data, a portion of video, a portion of audio, a portion of a graphic, a portion of text, etc.). The item component 302 can enable the storage and retrieval of sync metadata (e.g., to be treated as a token, small blob, etc.). The item level metadata can include a pair (e.g., a first number, a second number, a small number, a large number, etc.) to signify the update version structure. For instance, the update version structure can include the last updater (e.g., entity that provided a change/update with data) and virtual time of the update in the local time of the endpoint making the change. For example, the item component 302 can utilize a creation version that can be employed with specific conflict resolution and detection scenarios and tombstone cleanup (e.g., discussed in more detail below). In another example, the item component 302 can utilize a BOOL as at least one of a deletion flag or a tombstone marker.

The system 300 can further include a collection handler 304 that can enforce a metadata characteristic for a collection of synchronized items (e.g., an album, an address book, a folder, etc.). The collection handler 304 can enable storage and retrieval of serialized sync metadata that clients can use as a basis for change enumeration and conflict detection. In one example, a tombstone cleanup can be utilized as a strategy for cleaning up remote deletes (e.g., from a data store, etc.). This collection level metadata can be a token that can be utilized in a multi-master sync system such as a clock vector. The collection handler 304 can utilize a vector of versions along with extended information to allow partial updates, interruptions, filtering, etc.

The system 300 can include a conflict resolver 306 that can utilize an update algorithm to enable correct conflict detection and resolution propagation. The conflict resolver 306 can employ an algorithm that allows the web service 104 to take part in sync and allow endpoints to rationalize when updates are in conflict. When an update is made by a non-sync enabled client (e.g., web user interface, existing applications, third parties, etc.), the conflict resolver 306 can wipe the update version information for the item being updated while maintaining the rest of the metadata (e.g., creation version) intact. It is to be appreciated that this can allow an endpoint to determine if the item was updated (e.g., a user updating an item that they have already "seen"). When a sync enabled endpoint makes an update to an item, the conflict resolver 306 can leverage an endpoint's API to set the version information for the item. The web service 104 can respect this entry and not modify or manipulate such version information. The conflict resolver 306 can further handle deletes and tombstones. In particular, the conflict resolver 306 can keep a copy of the sync metadata and give access to the deleted item list when an item is deleted. Moreover, the conflict resolver 306 can give access to the additional sync metadata assigned from the time of the update. Moreover, the sync enabled endpoint can also make a copy of the collection level metadata taken as the snapshot for synchronization.

Figure 4:
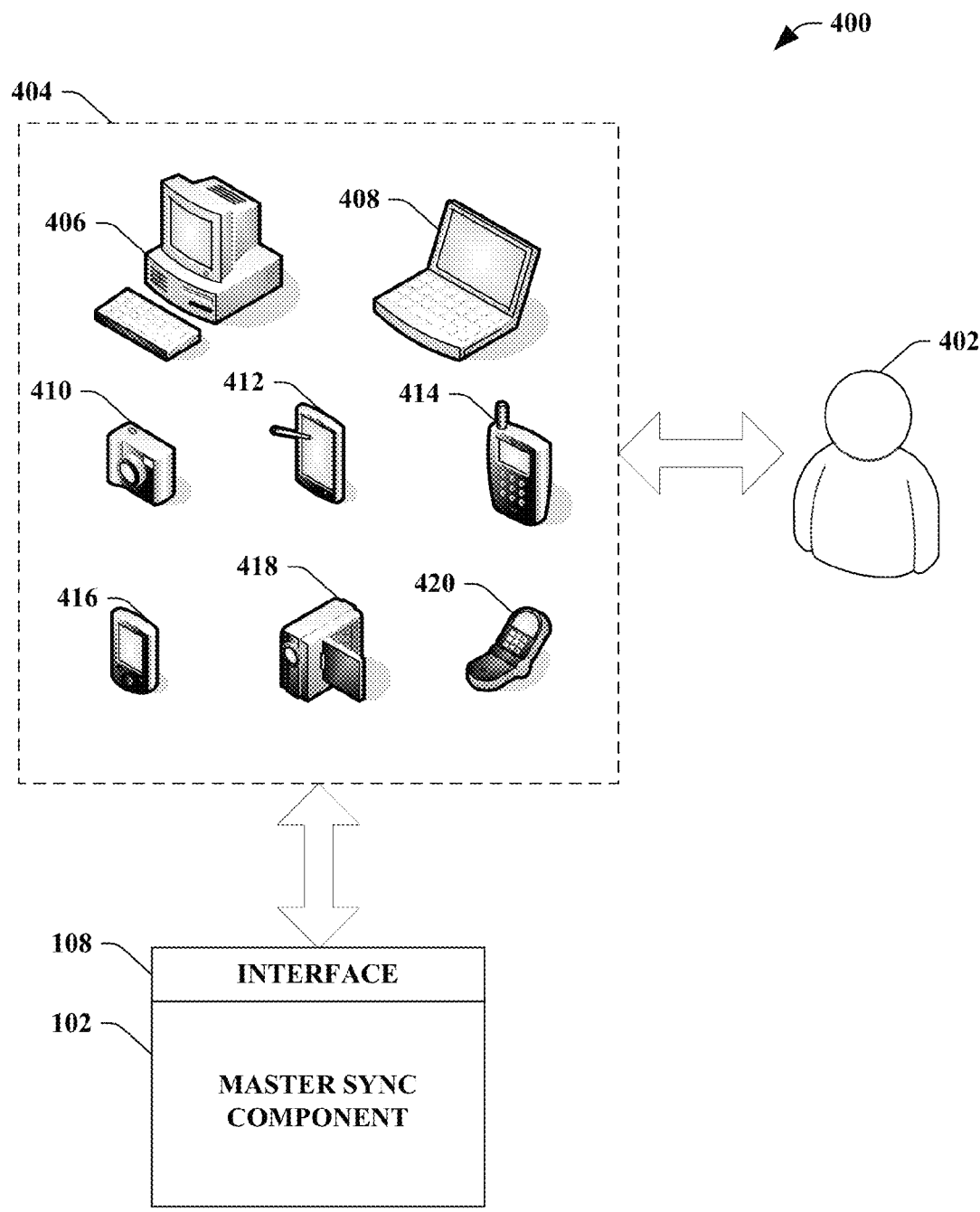
FIG. 4 illustrates a block diagram of an exemplary system that facilitates managing data consistency between a plurality of devices associated with a particular entity.

FIG. 4 illustrates a system 400 that facilitates managing data consistency between a plurality of devices associated with a particular entity. The system 400 can include the master sync component 102 that can enforce metadata requirements for items and collection of items in order to ensure data synchronization for a plurality of devices 404. In particular, the plurality of devices 404 can be associated to a user 402. For example, the plurality of devices 404 can be utilized, accessed, owned, etc. by the user 402. Moreover, it is to be appreciated that the user 402 can be any suitable entity that can interact or communicate with at least one device. For instance, the entity can be, but is not limited to being, a person, a group of people, a machine, a website, a corporation, a business, a community, a family, a network, a server, etc.

The user 402 can interact or utilize various devices in order to collect, manipulate, manage, communicate, browse, edit, etc. data and/or items. In this particular example, the plurality of devices 404 can include a desktop computer 406, a laptop machine 408, a digital camera 410, a tablet computer 412, a smartphone 414, a portable digital assistant (PDA) 416, a video camera 418, and a cellular phone 420. The master sync component 102 can enable data consistency and synchronization between two or more of the plurality of devices 404. By allowing the two or more devices to be synchronized with data, the user 402 can manage data in a seamless and universal manner. In other words, data on each device can be consistent in order to provide each device with the substantially similar data thereupon. Moreover, it is to be appreciated that the user 402 can provide user preferences and/or settings. Such personalized settings can include which data to synchronize, which devices to synchronize with, security settings (e.g., usernames, passwords, etc.), frequency of synchronization, and/or any other suitable setting associated with data consistency.

Figure 5:
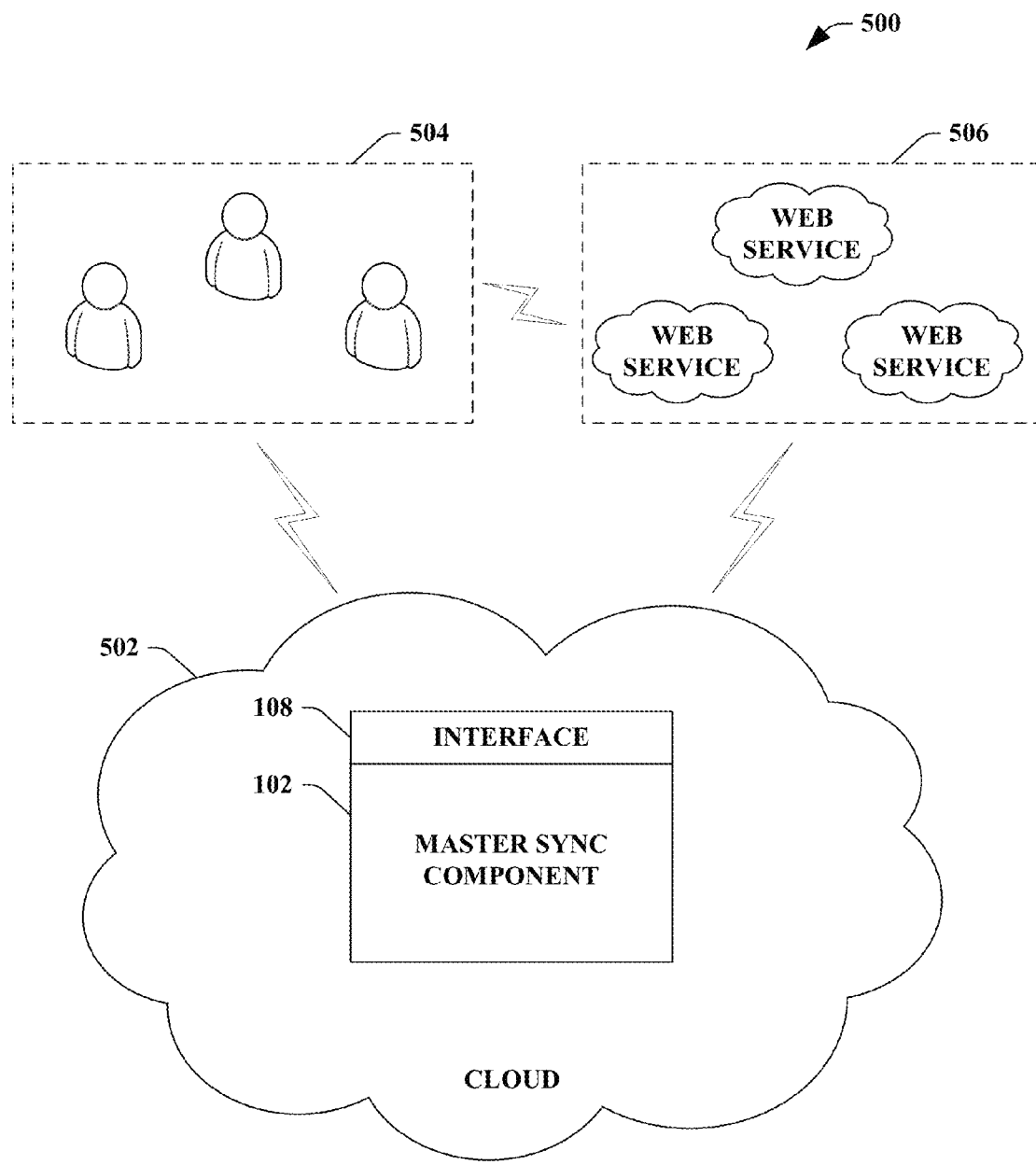
FIG. 5 illustrates a block diagram of exemplary system that facilitates enhancing identifying data updates and permeating such updates to various devices and/or web services.

FIG. 5 illustrates a system 500 that facilitates enhancing identifying data updates and permeating such updates to various devices and/or web services. The system 500 can further utilize a cloud 502 that can incorporate at least one of the annotation aggregator 102, the POI (not shown), the interface 108, a map with identified POI data 504, and/or any suitable combination thereof. It is to be appreciated that the cloud 502 can include any suitable component, device, hardware, and/or software associated with the subject innovation. The cloud 502 can refer to any collection of resources (e.g., hardware, software, combination thereof, etc.) that are maintained by a party (e.g., off-site, on-site, third party, etc.) and accessible by an identified user 504 over a network (e.g., Internet, wireless, LAN, cellular, Wi-Fi, WAN, etc.). The cloud 502 is intended to include any service, network service, cloud service, collection of resources, etc. and can be accessed by an identified user via a network. For instance, two or more users (e.g., users 504) can access, join, and/or interact with the cloud 502 and, in turn, at least one of the master sync component 102, the interface 108, and/or any suitable combination thereof. For example, the users 504 can communicate with the cloud 502 in order to access a web service from a collection of web services 506. Moreover, during such communications with the web services 506, the cloud 502 can provide data synchronization via the master sync component 102. In addition, the cloud 502 can provide any suitable number of service(s) to any suitable number of user(s) and/or client(s). In particular, the cloud 502 can include resources and/or services that provide data consistency between two or more devices associated with a user or between a web service and two or more devices associated with a user. In particular, the cloud 502 can leverage a resource associated with at least one device in order to provide data synchronization, wherein the cloud 502 can automatically and dynamically ensure data consistency independent of the resources from the web service.

Figure 6:
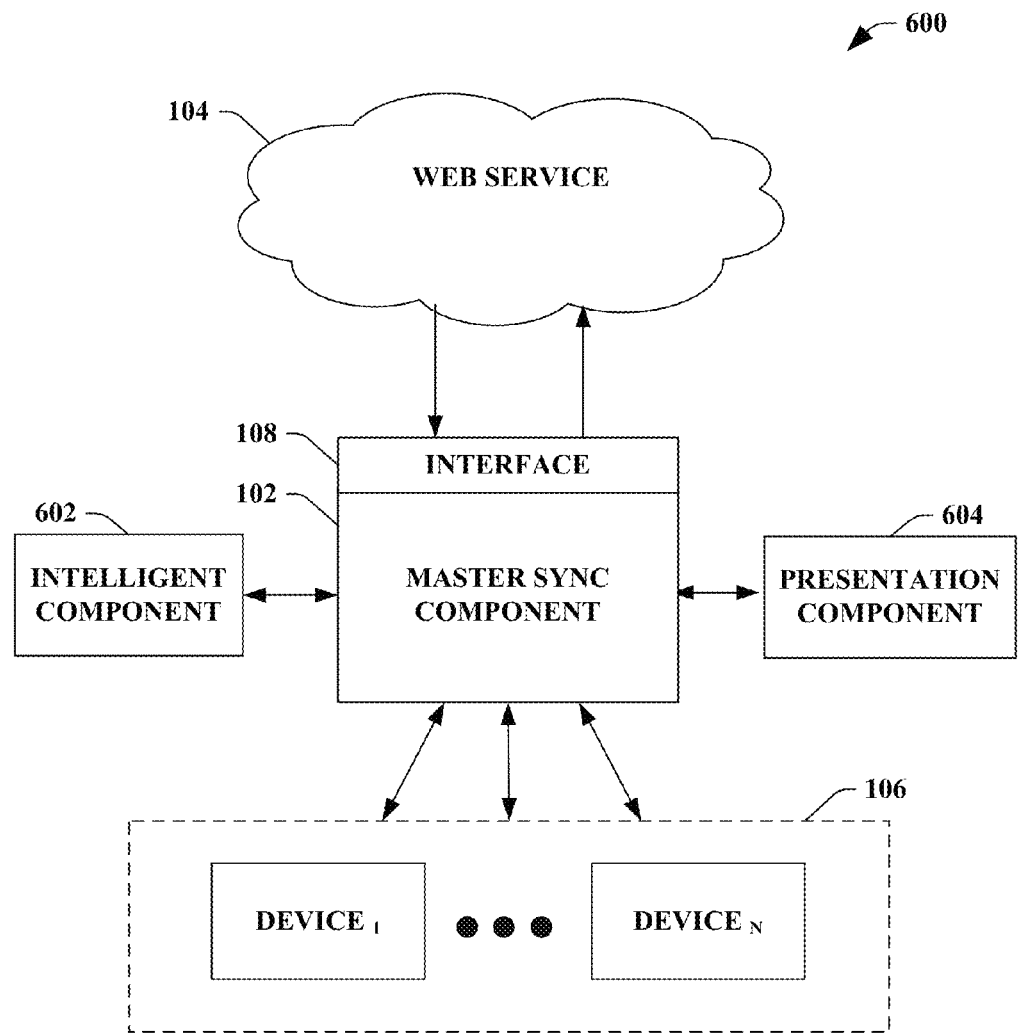
FIG. 6 illustrates a block diagram of an exemplary system that facilitates automatically managing data synchronization between a plurality of devices and/or devices and a web service.

FIG. 6 illustrates a system 600 that employs intelligence to facilitate managing data synchronization between a plurality of devices and/or devices and a web service. The system 600 can include the master sync component 102, the two or more devices 106, the web service 104, and the interface 108, which can be substantially similar to respective components, devices, services, and interfaces described in previous figures. The system 600 further includes an intelligent component 602. The intelligent component 602 can be utilized by the master sync component 102 to facilitate synchronizing data. For example, the intelligent component 602 can infer metadata characteristics for items, metadata characteristics for collection of items, synchronization settings, conflict detection, conflict resolution, token data associated with item level metadata, token data associated with collection level metadata, update version structure, metadata pair, serialized sync metadata, clock vector data, vector of version data, endpoint data, etc.

The intelligent component 602 can employ value of information (VOI) computation in order to identify optimal data to synchronize and priorities associated therewith. For instance, by utilizing VOI computation, the most ideal and/or appropriate data can be synchronized between the two or more devices 106 or between the web service 104 and two or devices 106. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The master sync component 102 can further utilize a presentation component 604 that provides various types of user interfaces to facilitate interaction between a user and any component coupled to the master sync component 102. As depicted, the presentation component 604 is a separate entity that can be utilized with the master sync component 102. However, it is to be appreciated that the presentation component 604 and/or similar view components can be incorporated into the master sync component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the master sync component 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
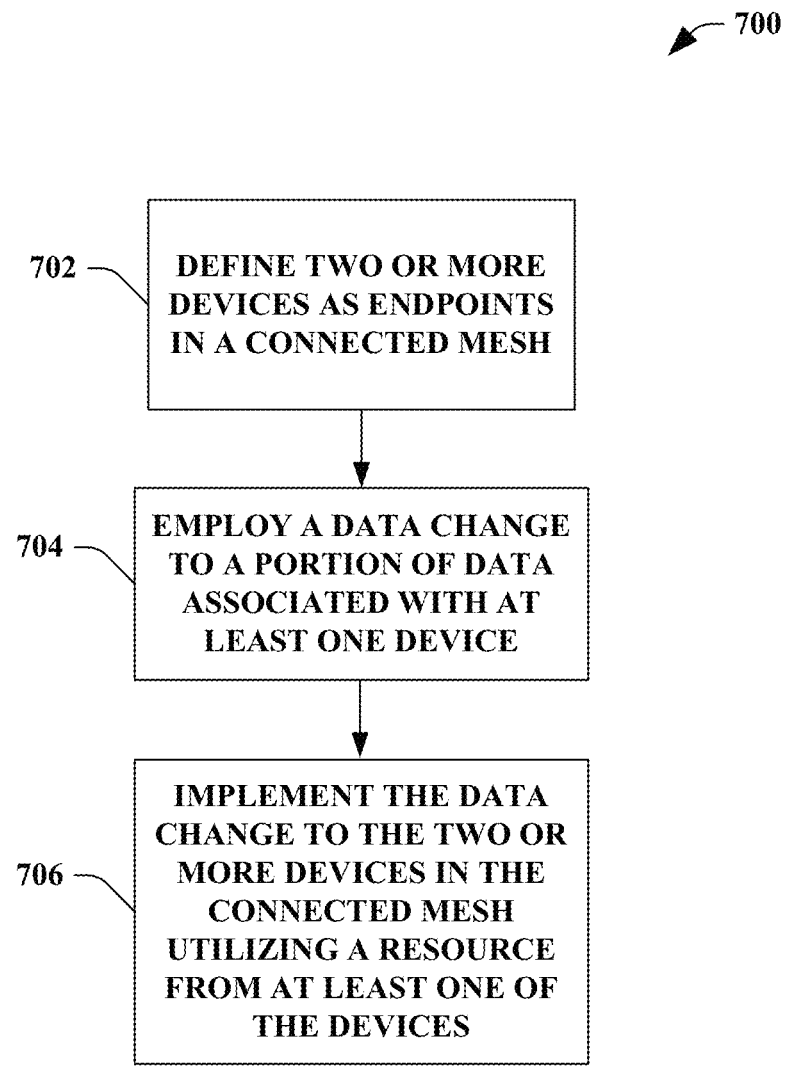
FIG. 7 illustrates an exemplary methodology for managing data consistency between a plurality of devices associated with a particular entity.
Figure 8:
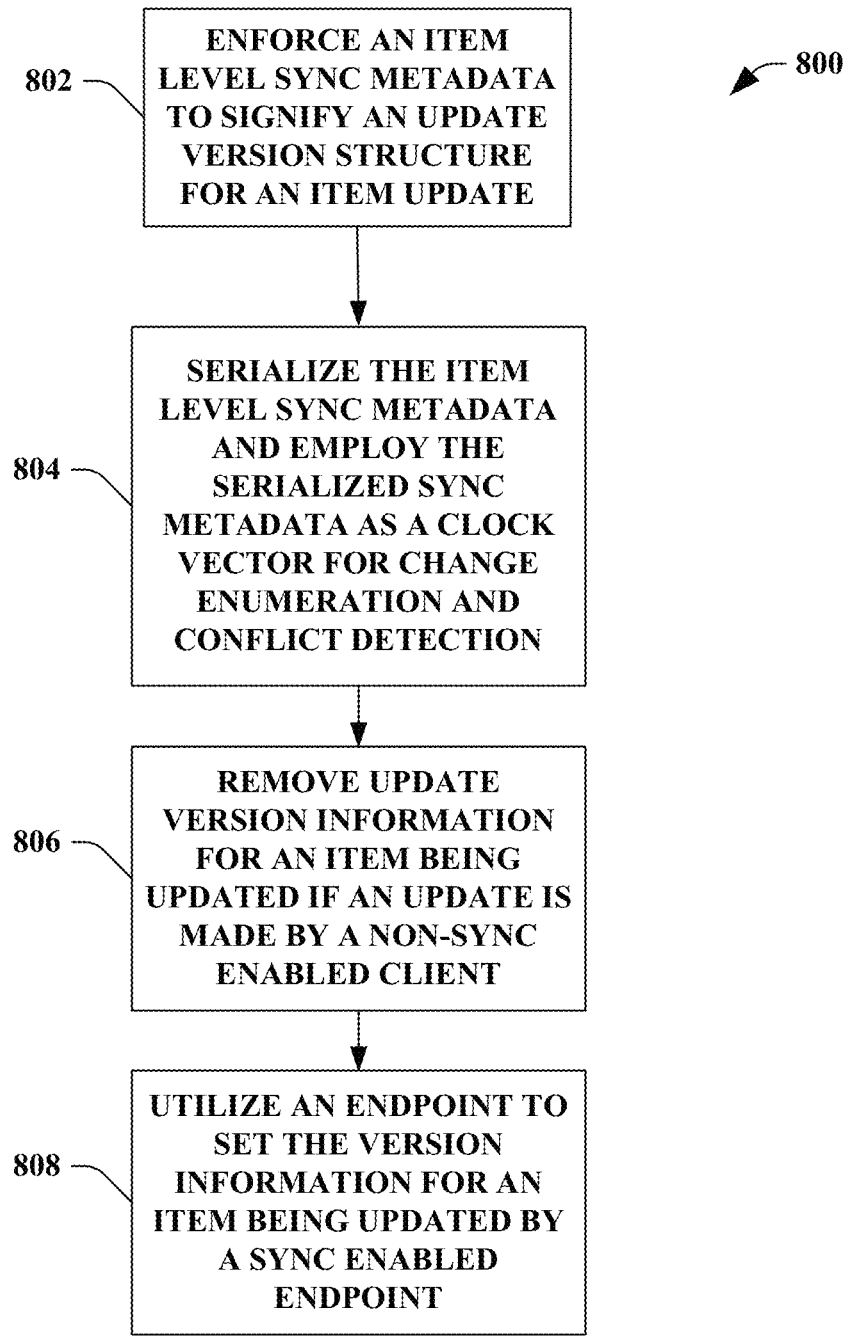
FIG. 8 illustrates an exemplary methodology that facilitates adapting a web service for seamless and universal data synchronization between two or more user devices.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates managing data consistency between a plurality of devices associated with a particular entity. At reference numeral 702, two or more devices can be defined as endpoints in a connected mesh. For example, the device can be, but is not limited to being, a smartphone, a laptop, a desktop, a computer, a machine, a portable digital assistant (PDA), a cellular device, a pager, a two-way, a hand-held, a mobile device, a browsing device, a wireless device, a portable gaming device, a gaming console, a media player, a portable media player, a pen drive, a hard drive, a data store, a digital camera, an image collecting device, a video collecting device, a video camera, an audio collecting device, an audio recorder, global positioning system (GPS), portable web browser, etc.

At reference numeral 704, a data change can be employed to a portion of data associated with at least one device. For example, the data change can be an addition of data, a deletion of data, a manipulation of data, an editing of data, and/or any other suitable modification to data. At reference numeral 706, the data change can be implemented to the two or more devices in the collected mesh utilizing a resource from at least one of the devices. For example, a device resource can be utilized to employ data synchronization across two or more devices within the connected mesh. In another example, the data synchronization can be between a web service and two or more devices within the connected mesh. Moreover, it is to be appreciated that a computing resource from the web service need not be leveraged in order to provide data synchronization therewith.

FIG. 8 illustrates a method 800 for adapting a web service for seamless and universal data synchronization between two or more user devices. At reference numeral 802, an item level sync metadata can be enforced to signify an update version structure for an item update. The item can be, for example, a photo, a personal contact, an image file, a portion of data, a portion of video, a portion of audio, a portion of a graphic, a portion of text, etc. In particular, the item level sync metadata can be a pair such as a first number and a second number (e.g., a small number, a large number, etc.). Moreover, the version structure can include a most recent updater and virtual time of update in the local time of the endpoint making the change or item update.

At reference numeral 804, the item level sync metadata can be serialized and employed as a clock vector for change enumeration and conflict detection. For example, the serialized item level sync metadata can be utilized by a client for the basis of change enumeration and conflict detection. Furthermore, the serialized item level sync metadata can be defined to be vector of versions along with extended information to allow for partial updates, interruptions, filtering, etc.

At reference numeral 806, update version information can be removed for an item being updated if an update is made by a non-sync enabled client. In other words, information related to the update version structure can be removed in order to allow an endpoint (e.g., a device, etc.) to determine if an item that has been seen or accessed has been updated. For instance, a non-sync enabled client can be, but is not limited to being, a web UI, an existing application, a third-party, etc. At reference numeral 808, an endpoint can be utilized to set the version information (e.g., related to the update version structure) for an item being updated by a sync enabled endpoint. In one example, an API related to the endpoint can be utilized to set the version information for the item when the item is updated.

Figure 9:
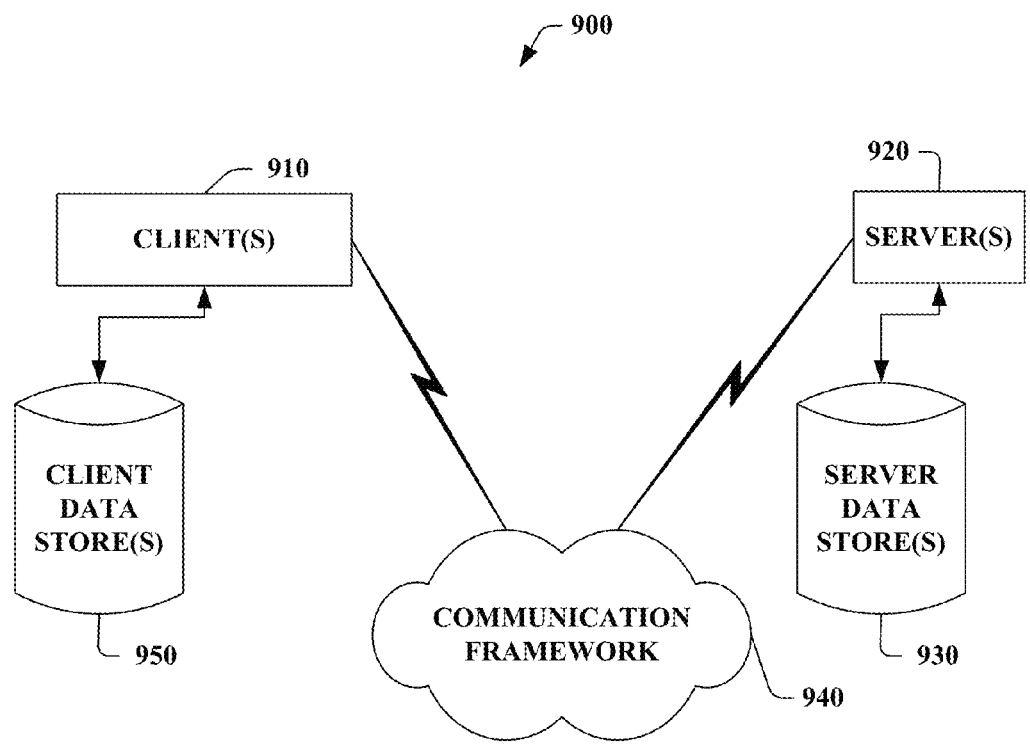
FIG. 9 illustrates an exemplary networking environment, wherein the novel aspects of the claimed subject matter can be employed.
Figure 10:
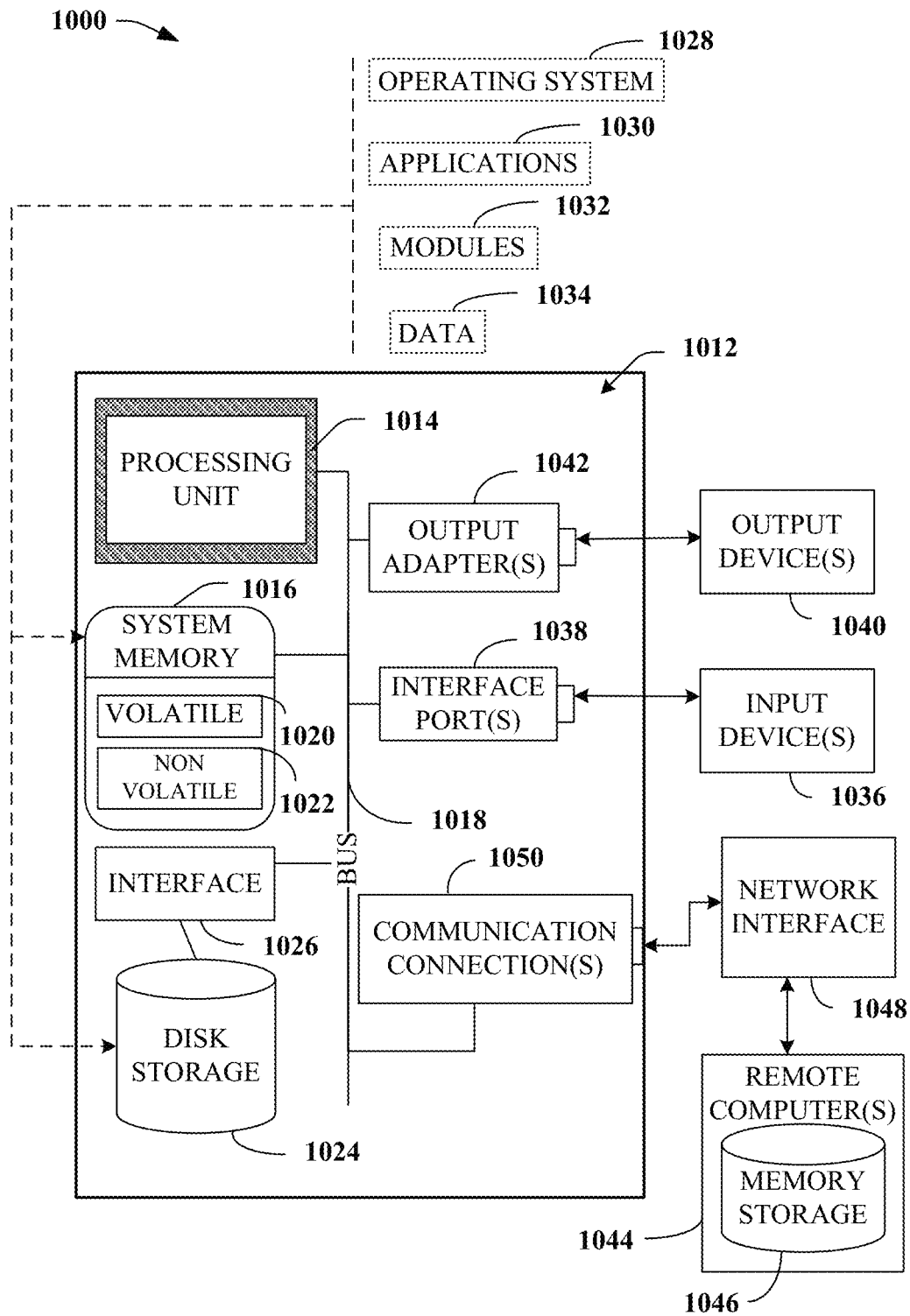
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a master sync component that utilizes a universal algorithm for data synchronization between a plurality of devices, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system comprising:
    at least one processor and at least one memory;
    a synchronization component configured to maintain data consistency by synchronizing a collection of data having serialized item-level metadata; and
    wherein the item-level metadata includes an update version structure associated with information including at least a last updater, a local update time, and a vector of update versions.

2. The system of claim 1 further comprising:
    a collection handler configured to serialize the item-level metadata for the collection of data.

3. The system of claim 1 further comprising:
    an item component configured to enable storage and retrieval of metadata at an item level.

4. The system of claim 1 wherein the synchronization component is configured to interface with a web service.

5. The system of claim 4 wherein the web service is configured to extend at least one of an offline data synchronization between multiple endpoints or a collaboration scenario between multiple endpoints.

6. A computer readable media, wherein the computer readable media comprises at least one hardware device, having computer readable instructions that when executed cause a computer to:
store on a second computer readable storage media serialized item level metadata for a collection of synchronizable data comprising an update version structure including at least three fields, the at least three fields comprising a last updater field, a local update time field, and a vector of update versions field.

7. The computer readable media of claim 6 further comprising instructions to:
store on the second computer readable storage media collection level metadata associated with the collection of synchronizable data.

8. The computer readable media of claim 6 further comprising instructions to:
store sync metadata for the collection of synchronizable data comprising a creation version field comprising at least one of specific conflict resolution, conflict detection, or tombstone cleanup.

9. The computer readable media of claim 6 wherein the computer readable storage media and the second computer readable storage media are the same storage media.

10. The computer readable media of claim 6 further comprising instructions to:
store on a third computer readable storage media serialized item level metadata for a collection of synchronizable data comprising an update version structure including at least three fields, the at least three fields comprising a last updater field, a local update time field, and a vector of update versions field.

11. A computer implemented method comprising:
for each data item of a collection of data items to be synchronized between at least two locations, storing item-level synchronization metadata using an update version structure associated with information including at least a last updater, a local update time, and a vector of update versions; and
serializing the item-level synchronization metadata for the collection of data items.

12. The computer implemented method of claim 11 wherein the serializing is performed by a synchronization component disposed at at least one of the at least two locations.

13. The computer implemented method of claim 11 further comprising:
detecting a change in a data item at first location; and
updating the stored item-level synchronization metadata for the data item.

14. The computer implemented method of claim 13 further comprising:
synchronizing the data item between the at least two locations based on the item-level synchronization metadata for serialized item-level synchronization metadata for the updated data item.

15. The computer implemented method of claim 14 further comprising:
performing resolution of conflicts associated with the synchronizing, the performing the resolution of conflicts including utilizing the serialized item-level synchronization metadata for change enumeration and conflict detection.

16. The computer implemented method of claim 14 further comprising:
wiping update version information in the update version structure while maintaining the item level metadata when based on a characteristic associated with the first location.

* * * * *